May 25, 1937.  F. N. MURPHY  2,081,248
FLUID PRESSURE OPERATED CAMERA DOLLY
Filed April 4, 1932  2 Sheets-Sheet 1
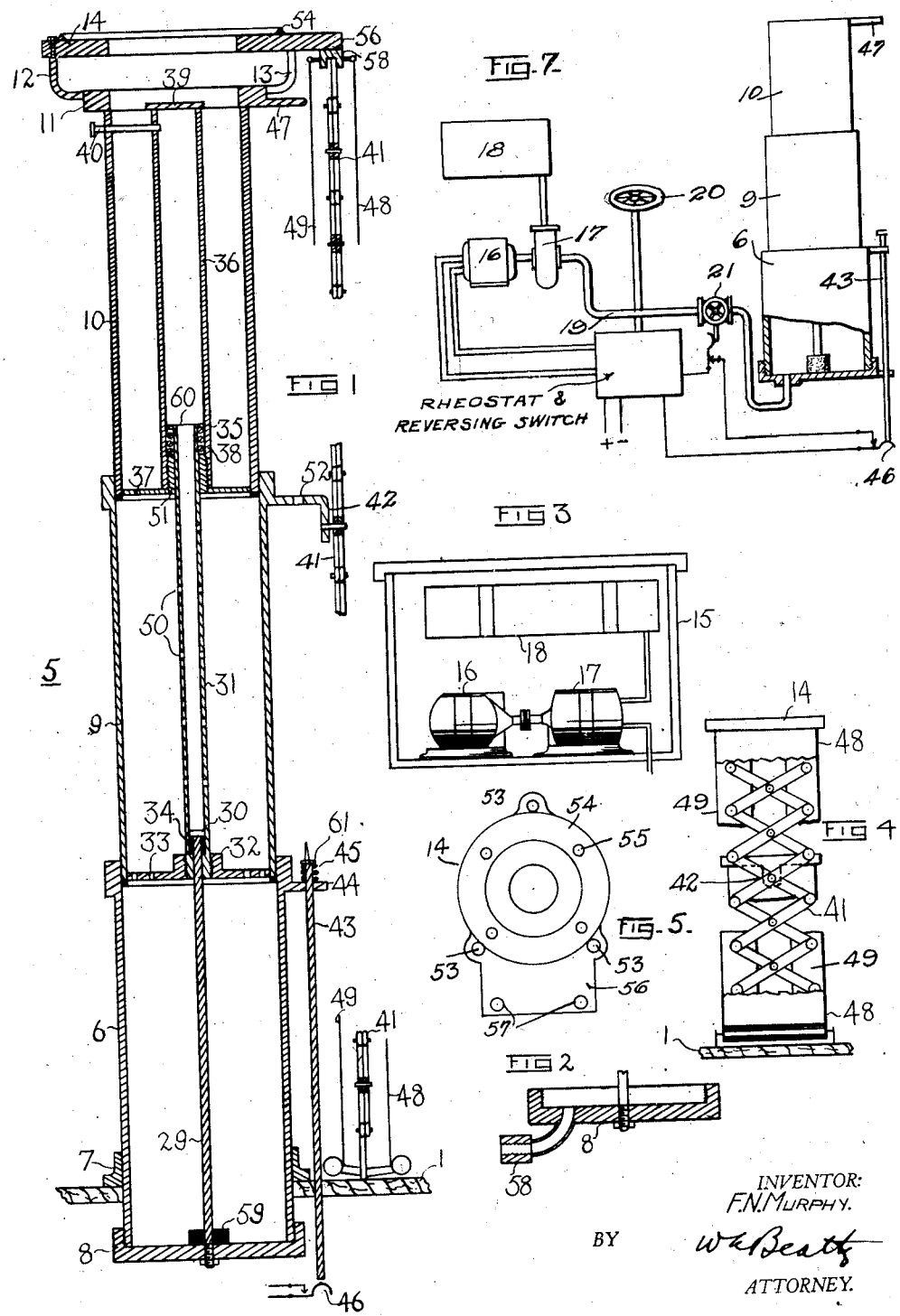
INVENTOR:
F. N. MURPHY.
BY
W. R. Beatty
ATTORNEY.

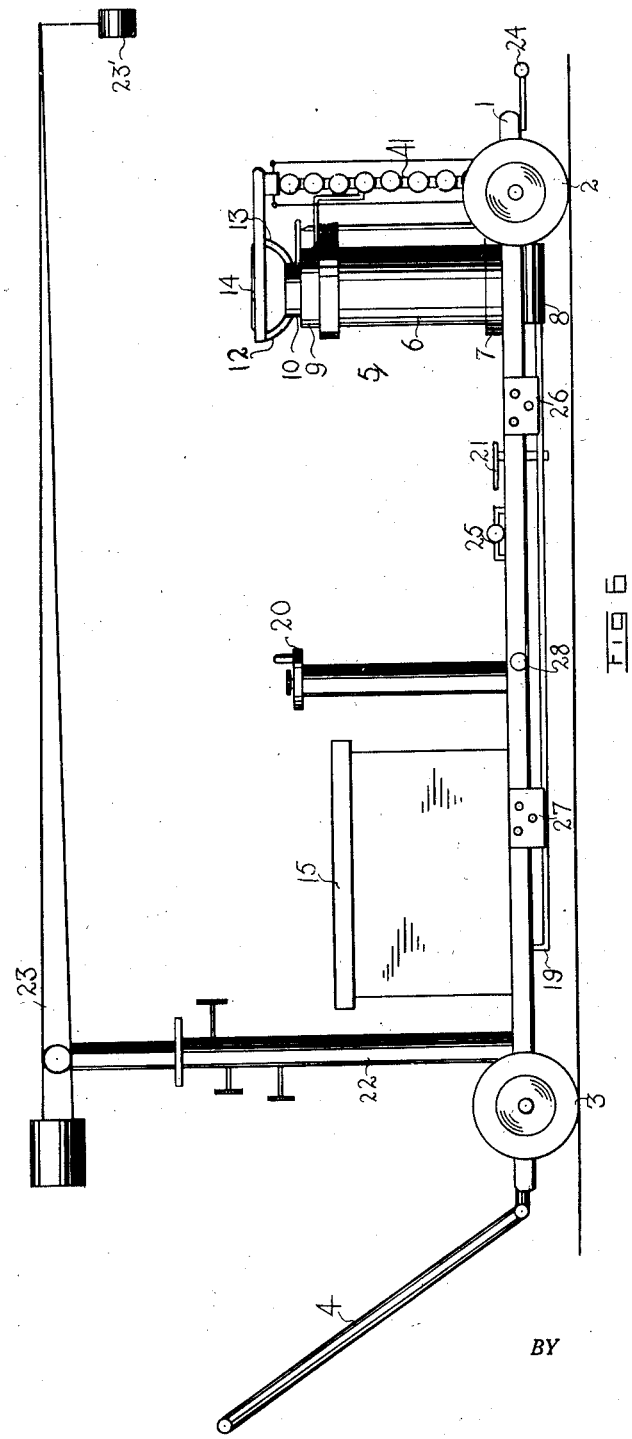

Patented May 25, 1937

2,081,248

UNITED STATES PATENT OFFICE 2,081,248

FLUID PRESSURE OPERATED CAMERA DOLLY

Frank N. Murphy, Hollywood, Calif., assignor to Warner Bros. Pictures, Inc., New York, N. Y., a corporation of Delaware Application April 4, 1932, Serial No. 603,139

5 Claims. (Cl. 60—52)

The invention relates to a camera dolly which provides means for transporting a motion picture camera from place to place, particularly while the camera is in operation, for making running "shots" and the like, and has for an object to support the camera, whereby during photographic operations thereof, i. e., for so-called "elevator shots" it may be raised or lowered a suitable amount and in a smooth manner, without jerking or jarring the camera.

This object is accomplished by the use of one or more of the following features: a camera support which may be gradually raised or lowered by hydraulic pressure; a camera support provided with a rotary pump mounted on the dolly for supplying liquid under pressure to raise and lower the camera; a hydraulic camera support comprising concentric cylinders wherein means are provided for preventing jarring of the camera due to telescoping said cylinders; means for shutting off the motor pump before the cylinders are collapsed to prevent jarring the camera; means for preventing turning of the camera support while it is being telescoped; and means for locking the hydraulic camera support in its elevated position.

A further feature of the invention provides a fixed relation between the camera dolly and the microphone during the transport of the camera while making a running "shot". The invention provides a microphone boom mounted on the camera dolly for this purpose, whereby the sound from the field being photographed may be conveniently recorded while moving the camera to make a running "shot".

For further details of this invention, reference may be had to the accompanying drawings, in which Fig. 1 is a vertical cross-section of a plurality of hydraulic cylinders especially adapted for the support of motion picture cameras.

Fig. 2 is a vertical cross-sectional view of the base plate at right angles to the section in Fig. 1.

Fig. 3 is a schematic elevation of the oil pump system.

Fig. 4 is a front elevation showing the construction of the supporting lazy tongs for preventing the hydraulic support from turning.

Fig. 5 is a plan view of the top of the hydraulic support with means for attachment to a camera free-head.

Fig. 6 is a diagrammatic side elevation of a completed camera dolly with hydro-electric lifting gear for the camera.

Fig. 7 is a diagrammatic view illustrating the electrical and mechanical connections between the motor and its associated elements.

Referring to Fig. 6, the camera dolly consists of a substantially rectangular base or platform 1, supported by suitable pneumatic tired dirigible wheels, of which 2 and 3 are shown. These wheels are mounted for rotation on spindles, in the usual manner. At the rear end of the dolly a handle 4 is journaled to a connecting link (not shown) between the two rear wheels, so that the dolly may be manually moved and turned.

At the forward end of the dolly is positioned an extensible or collapsible hydraulic camera support 5 (shown in detail in Fig. 1). This support consists primarily of a hollow cylinder 6 which is screw-threaded at an intermediate point into a flange 7 on the platform 1, whereby a base plate 8 (shown in detail in Fig. 2) projects underneath thereof. Concentric with cylinder 6 are two hollow telescoping cylinders 9 and 10. Bolted to a flange 11 at the top of cylinder 10, by means of projecting arms 12 and 13, is a camera supporting platform 14, which is adapted to be attached to the free-head of a motion picture camera.

Within a casing 15, resting on and suitably fastened to the platform 1, is an electric motor 16 (Fig. 3) coupled to a rotary pump 17. This pump is used to force oil under pressure to or from an oil reservoir 18, through an oil pipe 19 (Fig. 6) that runs underneath and substantially parallel with the platform 1, to the nipple 58 (Fig. 2) in the base plate 8 of the telescopic hydraulic support 5. The electric motor 16 is connected through a well known rheostat control 20, so that the speed and direction of rotation of the motor may be controlled. Control 20 is mounted on platform 1 and connected to the ordinary power source through a flexible cable, as is well understood. This rheostat control 20 gives the camera operator perfect control of the oil supplied under pressure to or withdrawn from the hydraulic camera support 5, and permits gradual raising or lowering, respectively, of the camera, without jars or jerks.

A manually operated valve 21 is inserted in the oil pipe line between the pump 17 and the hydraulic support 5, to prevent oil from seeping back to the reservoir 18 when the operator wishes to lock the hydraulic support 5 in any desired position. As a safety device, the spindle of valve 21 carries a switch (Fig. 7) which opens the circuit of motor 16 when this valve is closed and closes this motor circuit when valve 21 is open, as will be understood.

A hollow cylindrical support 22 for a microphone boom 23 is mounted to the rear of platform 1, so that it will not interfere with the movements of the camera operator. At the same time, this assures a fixed relation between the camera and the microphone 23' for recording sound during the making of a running "shot". Sometimes it is found desirable to carry lights on the dolly, and so a lamp bracket 24 is bolted to the foremost end of the dolly, and another lamp bracket 25 is mounted at the mid-point on the platform 1.

Two flanges 26 and 27 are placed on the side of the platform 1, to which running-boards may be bolted, and a bearing 28 is secured to a midpoint of platform 1, to receive the stub axle of an auxiliary wheel, in case such an additional wheel is necessary for stability.

Referring to Fig. 1, the collapsible hydraulic support before mentioned has a rod 29 carried within the bottom cylinder 6, the lower end of which is bolted to the base plate 8 of this cylinder. Surrounding rod 29 at the bottom thereof is a block of rubber 59 to prevent piston-head 33 from bumping base plate 8 when support 5 is collapsed, whereby jarring of the camera is avoided.

The opposite end of the rod 29 projects into a hollow cylinder 31 having apertures 50 to permit oil pressure to be applied to piston-head 39. This cylinder 31 is screwed into a collar 32 on the base plate or piston-head 33 of the middle cylinder 9. At the lower inside end of this cylinder 31 is a hollow rubber cushion 34, which surrounds the rod 29 and prevents the head 30 of rod 29 from bumping the bottom of the cylinder 31 when the device is fully extended, whereby jarring of the camera is avoided.

The upper end of the cylinder 31 is provided with a retaining plate 35 having oil passage 60, and which bears against the top of spring 38 when cylinder 10 is extended. Inside the upper telescoping cylinder 10 is cylinder 36, the bottom of which is screwed to a collar 51 on the base plate 37 of cylinder 10. Inside the cylinder 36 and outside of cylinder 31 is a helical spring 38 resting on collar 51 to prevent the plate 35 thereof from bumping the base plate or piston 37 when the device is fully extended. The upper end of cylinder 36 is closed by a cap 39, and an air valve 40 projects therefrom through the wall of the outer cylinder 10 to allow escape of trapped air.

Depending from and fastened to the front of the camera supporting platform 14, and preventing it from turning when the support 5 is extended or collapsed, is a link motion in the form of a set of lazy tongs 41, the lower end of which is suitably fastened to the platform 1, and the mid-point of which is fastened to a strap or flange 42 attached to the top of the cylinder 9. Two roller curtains 48 and 49, serving as guards, are placed in front of and behind the lazy tongs 41. The connection of both cylinders 9 and 10 to the link motion 41 insures that these two cylinders approach and reach the limits of their movement, both up and down, at the same time, whereby the stops or cushions 34 and 38 become effective simultaneously to limit the upward movement of both cylinders 9 and 10, whereby the cylinders approach and reach the position shown in Fig. 6 simultaneously, in which retracted position the piston head 33 strikes the cushion stop 59 to resiliently limit the retracted movement of both cylinders 9 and 10. When any of the stops 34, 38 or 59 become effective, the camera is jarred somewhat. It would probably spoil a picture if the stops 34, 38 became effective sequentially, the stop 34 for example being reached when the camera is elevated half-way and the stop 38 becoming effective a little earlier or later and before the camera has reached its uppermost position. This is avoided by the present construction by positively extending and withdrawing the cylinders 9 and 10 together in synchronism, whereby the limit stops can only become effective at the upward and downward limits of travel of the camera. In fact if the camera is not elevated to its highest possible position, the stops 34 and 38 do not become effective to limit the extension of the cylinders 9 and 10, thereby avoiding any bumping of the camera in this event. Between the lazy tongs 41 and the lower cylinder 6 is a rod 43 slidably mounted in apertures in base 1 and flange 44. Rod 43 is urged upwards by a helical spring 45 surrounding the top of this rod and resting upon the flange 44, the top of spring 45 bearing against collar 61 on rod 43. The lower end of this rod 43 extends below the platform 1 to a limit switch 46. When the cylinders are drawn in, a flange 47 at the top of the uppermost cylinder 10 presses down on the rod 43 (which projects through aperture 52 in strap 42) so that it actuates the limit switch 46 and opens the circuit of the motor 16 just before the cylinders are fully drawn in, to prevent the jarring thereof and of the camera mounted thereon.

Referring to Fig. 5, which shows a plan view of the platform 14 for supporting the camera free-head, the three symmetrically disposed apertures 53 are adapted to receive the screw-threaded extensions of three similar projecting threaded arms which arise from the flange 11, and two of which, 12 and 13, are illustrated in Fig. 1. The bottom of the camera free-head is adapted to rest on and is supported by the circular ridge 54 on the top of the platform 14. Symmetrically disposed about this ridge 54 are four apertures 55 to receive the fastening means, such as threaded bolts, on the camera free-head. The extension 56 of the platform 14 extends over the top of the lazy tongs 41 and is provided with threaded apertures 57 for suitably supporting by means of bolts, or the like, the cross-piece 58 to which the top of the lazy tongs 41 is suitably fastened.

It will be apparent, therefore, that the invention provides a camera dolly with means for very gradually raising and lowering the camera without jarring the same, and with a smoothness of motion which cannot be obtained by extensible camera supports making use of gears, lifting screws, or the like.

It will be apparent that various modifications may be made in the invention without departing from the scope of the appended claims.

I claim the following:

1. An hydraulic support comprising a stationary cylinder, a movable cylinder concentric therewith, a cushion stop for limiting the separation of said cylinders, another cylinder concentric with said cylinders, a cushion stop therefor, a pump for supplying and withdrawing liquid under pressure to and from said cylinders, means controlled by the collapse of said cylinders for stopping said pump before said cylinders are completely collapsed, and common means for controlling the relative movement between said cylinders and for preventing the rotation thereof.

2. An hydraulic support comprising a stationary cylinder, a plurality of movable concentric cylinders in said stationary cylinder, means for preventing said concentric cylinders from rotating during extension and collapse thereof, said means also synchronizing the movement of said movable cylinders, a pump for supplying liquid under pressure to said cylinders and for withdrawing liquid therefrom, and means controlled by the collapse of said cylinders for stopping said pump before said cylinders are completely collapsed.

3. An hydraulic support comprising a stationary cylinder, a plurality of movable concentric cylinders in said stationary cylinder, a co-axial cylinder within the innermost of said concentric cylinders, a piston head connecting the lower ends of said co-axial cylinder and the innermost of said concentric cylinders, means for sealing the top of said co-axial cylinder, a support at the top of the innermost of said concentric cylinders, and means for supplying liquid under pressure to said piston head and to the interior of said co-axial cylinder.

4. An hydraulic support comprising a stationary cylinder, a plurality of movable concentric cylinders in said stationary cylinder, an extensible support for preventing rotation of said concentric cylinders during extension and retraction thereof, means for supporting the lower portion of said support in fixed position with respect to said stationary cylinder, means for connecting separated points in said support to a plurality of said concentric cylinders respectively, and means for supplying liquid under pressure to said cylinders.

5. An hydraulic support comprising the combination of a plurality of movable concentric cylinders, means whereby a fluid is adapted to exert a pressure on each of said movable cylinders, and means for extending and retracting said movable cylinders in synchronism, whereby said movable cylinders reach the upper and lower limits of their movement simultaneously.

FRANK N. MURPHY.